United States Patent [19]

Glenn

[11] Patent Number: 5,333,930
[45] Date of Patent: Aug. 2, 1994

[54] SURFACE FOR A SEAT OF A CYCLE

[76] Inventor: Jerry L. Glenn, 2510 Adams Ave., Des Moines, Iowa 50310

[21] Appl. No.: 8,761

[22] Filed: Jan. 25, 1993

[51] Int. Cl.⁵ ............................................. A47C 31/11
[52] U.S. Cl. ............................ 297/219.11; 297/195.1
[58] Field of Search ................... 297/195, 219, 195.1, 297/219.1, 219.11, DIG. 6, 453; 428/12

[56] References Cited

U.S. PATENT DOCUMENTS

| | | | |
|---|---|---|---|
| 1,532,400 | 4/1925 | Grafe | 297/453 |
| 2,051,494 | 8/1936 | Mitchell et al. | 297/453 |
| 3,484,319 | 12/1969 | Takenaka | 156/297 |
| 3,514,156 | 5/1970 | Fields | 297/195 X |
| 3,838,869 | 10/1971 | Falkenberg | 297/195 X |
| 3,885,259 | 5/1975 | Cheong | 297/453 X |
| 4,012,072 | 3/1977 | Hansen | 297/219 |
| 4,657,270 | 4/1987 | Allen et al. | 297/195 X |
| 5,018,790 | 5/1991 | Jay | 297/DIG. 6 |

FOREIGN PATENT DOCUMENTS

| | | | |
|---|---|---|---|
| 469226 | 2/1992 | European Pat. Off. | 297/453 |
| 101346 | 2/1899 | Fed. Rep. of Germany | 297/195.1 |
| 510323 | 5/1957 | Italy | 297/195.1 |

OTHER PUBLICATIONS

Miles Kimball Company, Beaded Car-Seat, Dec. 1990, p. 58.

Primary Examiner—Kenneth J. Dorner
Assistant Examiner—David E. Allred
Attorney, Agent, or Firm—Brian J. Laurenzo; Kent A. Herink; Brett J. Trout

[57] ABSTRACT

An improved surface for a seat of a cycle allowing enhanced blood circulation to crotch and buttock regions of a cyclist as well as continuous air circulation between the crotch and buttock regions of the cyclist and the seat of the cycle, the improved surface comprising a multitude of incompressible beads strung together in a mesh-like configuration on the seat, the beads having a rounded surface for contact with the crotch and buttock regions of the cyclist.

7 Claims, 1 Drawing Sheet

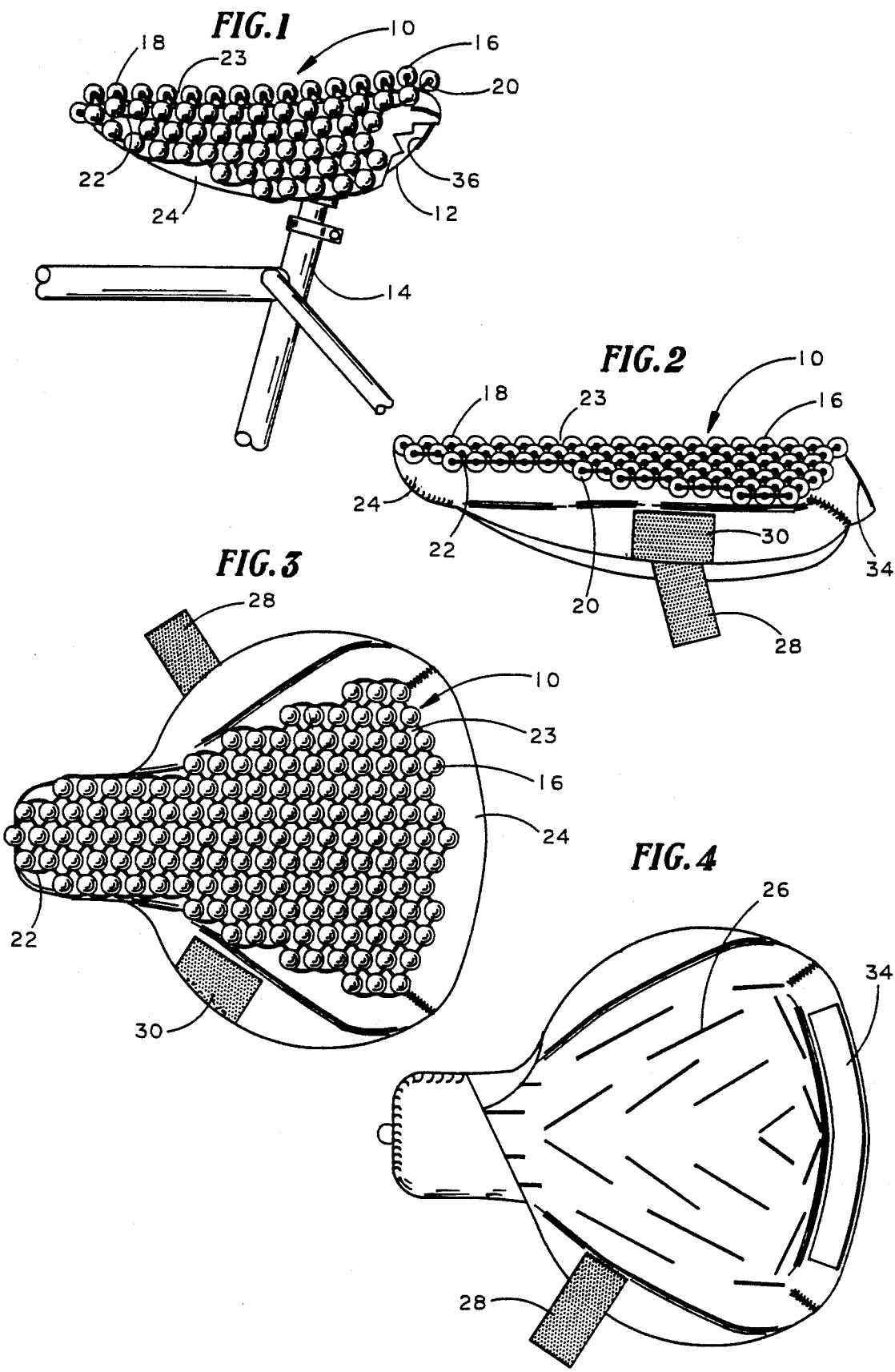

SURFACE FOR A SEAT OF A CYCLE

BACKGROUND OF THE INVENTION

This invention relates to types of cycles straddled by a user and, more particularly, to an improved surface for a seat of a cycle.

In the past, it has been desirable to make a seat for a cycle which would enhance the comfort level of a cyclist especially during long periods of time. Numerous different seats have been attempted, including those shown in U.S. Pat. Nos. 2,332,847 and 4,451,083. In addition, a seat or cover combined with a seat known as a gel seat is currently available.

The problem which is common to all prior art seats is that when a cyclist sits on the seat, his or her weight causes the otherwise raised padded portions of the seat to compress forming a flat interfacing surface between the crotch and buttock regions of the cyclist and the seat of the cycle. This flat, interfacing surface between the crotch and buttock regions of the cyclist and the seat of the cycle eliminates the circulation of air between the crotch and buttock regions of the cyclist and the seat of the cycle. The flat, interfacing surface further reduces the circulation of blood in the crotch and buttock regions of the cyclist. Both the elimination of air circulation and reduction of blood circulation in the crotch and buttock regions of the cyclist result in great discomfort to the cyclist.

It is also known in the prior art to use beads on an automobile seat cover, but such seat covers are substantially flat and not intended to conform with the seat of a cycle. Furthermore, such beaded seat covers for automobiles are not intended to contact the crotch and inner buttock regions of a user as does the portion of a seat of a cycle which projects between the legs of a cyclist.

The difficulties encountered in the prior art are substantially eliminated by the present invention.

SUMMARY OF THE INVENTION

Accordingly, it is an object of the present invention to provide means for increasing the comfort level of a cyclist.

It is another object of the present invention to provide means for enhancing the blood circulation in the crotch and buttock regions of a cyclist.

A further object of the present invention is to provide means for enhancing the circulation of air between the crotch and buttock regions of a cyclist and the seat of a cycle.

Yet another object of the present invention is to provide means for achieving the above objects which can be used with existing cycle seats.

Another object of the present invention is to provide an improved surface for a seat of a cycle which is incompressible under the weight of a cyclist.

Still another object of the present invention is to provide means for achieving the above objects which is easy to make and comprised from readily available materials.

These and other objects of the invention will become apparent upon reference to the following specification, drawings, and claims.

The present invention is an improved surface for a seat of a cycle allowing enhanced blood circulation to crotch and buttock regions of a cyclist as well as continuous air circulation between the crotch and buttock regions of the cyclist and the seat of the cycle, the improved surface comprising a multitude of incompressible massage members located where the crotch and buttock regions of the cyclist contact the seat, each of the massage members having a rounded surface for contact with the crotch and buttock regions of the cyclist.

BRIEF DESCRIPTION OF THE DRAWINGS

FIG. 1 is an elevational view of the improved surface of the present invention attached to a seat cover of a bicycle seat with part of the improved surface and seat cover cut away to show the seat;

FIG. 2 is an elevational view of the improved surface and seat cover of FIG. 1 removed from the bicycle seat;

FIG. 3 is a top plan view of the improved surface and seat cover of FIG. 1; and

FIG. 4 is a bottom plan view of the seat cover of FIG. 1.

DETAILED DESCRIPTION OF THE INVENTION

Illustrated in the Figures, generally at 10, is an improved surface for a seat 12 of a cycle 14 allowing enhanced blood circulation to crotch and buttock regions of a cyclist (not shown) as well as continuous air circulation between the crotch and buttock regions of the cyclist and the seat 12 of the cycle 14, the improved surface 10 comprising a multitude of incompressible beads 16 located where the crotch and buttock regions of the cyclist contact the seat 12, each of the beads 16 having a rounded surface 18 for contact with the crotch and buttock regions of the cyclist.

It is well known in the art how a cyclist sits on the seat of a cycle and which part of a cyclist, namely, the crotch and buttock regions, contact the seat of the cycle. For this reason, the crotch and buttock regions of the cyclist have not been shown as this addition to the drawings would have further obstructed the views of the improved surface which is the essence of the invention.

As shown in detail in the Figures, in the preferred embodiment of the improved surface 10, the beads 16 are substantially spherical-shaped wooden beads having a hollow passageway 20 therethrough. The beads 16 are strung together in a mesh-type configuration by string members 22. When the beads 16 are strung together, gaps 23 are formed therebetween allowing for air circulation. The mesh of beads 16 is then combined with the seat 12 of the cycle 14 so that the beads 16 contact the crotch and buttock regions of the cyclist when the cyclist sits on the seat 12 of the cycle 14.

In the preferred embodiment, the beads 16 are allowed to migrate in a limited manner along said string members 22 in accordance with the geometry of the crotch and buttock regions of a specific cyclist allowing the improved surface 10 to conform somewhat to the cyclist. The amount of limited migration available is dependent upon the number of beads 16 and the length of the string members 22. In other words, the limited migration depends on how tightly the beads 16 are strung on the string members 22. The beads 16 may also rotate about the string members 22 allowing further movement.

The beads 16 may be attached to a seat cover 24 such as a seat cover which is capable of enveloping the seat 12 of the cycle 14 thereby securing the beads 16 upon the seat 12. The beads 16 may be attached to the seat cover 24 by thread members 26 which secure the string members 22 and, in turn, the beads 16 to the seat cover 24. The seat cover 24 may be secured to the seat 12 by mated hook-and-loop-type fasteners 28, 30 and 34 which can be placed at various positions along the seat cover 24 as well as on the seat 12 as shown at 36.

The gaps 23 between the beads 16 of the improved surface 10 thus allow constant air circulation between the crotch and buttock regions of the cyclist and the seat 12 of the cycle 14 which enhances the comfort level of the cyclist. In addition, the incompressible uneven configuration of the improved surface 10 greatly increases blood circulation in the crotch and buttock regions of the cyclist which further enhances the comfort level of the cyclist. It is preferred that the beads be small and spherical-shaped to more easily conform with the tight and relatively small area of the cyclist which contacts the seat 12 of the cycle 14.

The invention may be made inexpensively from currently available materials. The beads 16 may be made of wood, plastic or any other substantially incompressible material. The string members 22 and thread members 26 may be made of leather or any other material which will provide for long lasting strength. The seat cover 24 may be made from any fabric although a leather-like material is preferred.

While a bicycle seat is shown in the Figures, it is anticipated that the invention could be used with any similar cycle seats such as those for motorcycles, stationary cycles, unicycles, etc.

Furthermore, it is anticipated that the improved surface could be incorporated between the crotch and buttock regions of the cyclist and the seat 14 in a variety of ways other than on the seat cover 24. For example, the beads 16 could be strung together and placed about the seat 14. In addition, the beads 16 could be attached directly to or even recessed within the seat 14. The beads 16 could be combined with a gel either on the seat 14 or the seat cover 24. The seat cover 24 could be placed over beads 16 which are attached to the seat 14. It is even possible that a cyclist would have beads sewn into his or her cycling shorts.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention.

What is claimed is:

1. An improved surface for a seat of a cycle allowing enhanced blood circulation to crotch and buttock regions of a cyclist as well as continuous air circulation between said crotch and buttock regions of said cyclist and said seat of said cycle, said improved surface comprising:
   (a) a seat cover capable of being secured to the seat of the cycle;
   (b) a plurality of spherical beads provided over said seat cover;
   (c) at least one filament interconnecting said spherical beads; and
   (d) attaching means directly attaching said filament to said seat cover;
   (e) wherein said attaching means passes through said seat cover.

2. The improved surface, according to claim 1, in which said seat cover may be attached via seat cover attachment means about the seat of the cycle in a substantially fixed orientation thereon.

3. The improved surface, according to claim 2, in which said seat cover attachment means comprise hook and loop type fasteners.

4. The improved surface, according to claim 1, in which said beads are allowed limited movement along said filament.

5. The improved surface according to claim 1, in which said beads are allowed to rotate about said filament.

6. The improved surface according to claim 1, in which said beads are attached in rows via said filament.

7. The improved surface according to claim 4, in which said movement and spacing of said beads on said filament is determined by the number of said beads and the length of said filament.

* * * * *